United States Patent [19]

Sidler et al.

[11] Patent Number: 4,723,980
[45] Date of Patent: Feb. 9, 1988

[54] DRIVE SYSTEM FOR A GLASS CONTAINER PRODUCTION LINE

[75] Inventors: Werner Sidler, Eddlingen; Werner Munz, Obfelden; William Grueninger, Zurich, all of Switzerland

[73] Assignee: Emhart Industries, Inc., Farmington, Conn.

[21] Appl. No.: 77,966

[22] Filed: Jul. 24, 1987

Related U.S. Application Data

[63] Continuation of Ser. No. 862,850, May 13, 1986, abandoned.

[30] Foreign Application Priority Data

May 15, 1985 [GB] United Kingdom ............... 8512269

[51] Int. Cl.⁴ .......................... C03B 7/14; C03B 9/40
[52] U.S. Cl. .......................................... 65/163; 65/29; 65/164; 65/DIG. 13
[58] Field of Search ................ 65/29, 163, DIG. 13, 65/164

[56] References Cited

U.S. PATENT DOCUMENTS

| | | | |
|---|---|---|---|
| 4,004,904 | 1/1977 | Fergusson | 65/DIG. 13 |
| 4,007,028 | 2/1977 | Bublitz et al. | 65/DIG. 13 |
| 4,382,810 | 5/1983 | Wood | 65/163 X |
| 4,409,013 | 10/1983 | Cardenas et al. | 65/DIG. 13 |
| 4,427,431 | 1/1984 | Mumford et al. | 65/163 |

*Primary Examiner*—Arthur Kellogg
*Attorney, Agent, or Firm*—Arthur B. Moore

[57] ABSTRACT

The drive system comprises a motor (10) to drive a glass gob producing feeder, a motor (18) to drive a gob distributor for distributing the gobs to sections of a glass container manufacturing machine of the individual section type, and a motor (34) to drive a container-removing conveyor. The drive means supplies electrical signals to cause the motors to operate at desired speeds. The drive system comprises a source (52) of a basic frequency signal which can be varied by varying means (54) to determine the speed of the entire production line, means (58) for producing a gob distributor controlling signal by dividing the basic frequency by a factor reflecting the number of machine sections, and means (62,66) for producing a conveyor system controlling signal by multiplying the basic frequency by a factor reflecting the number and spacing of the containers.

11 Claims, 1 Drawing Figure

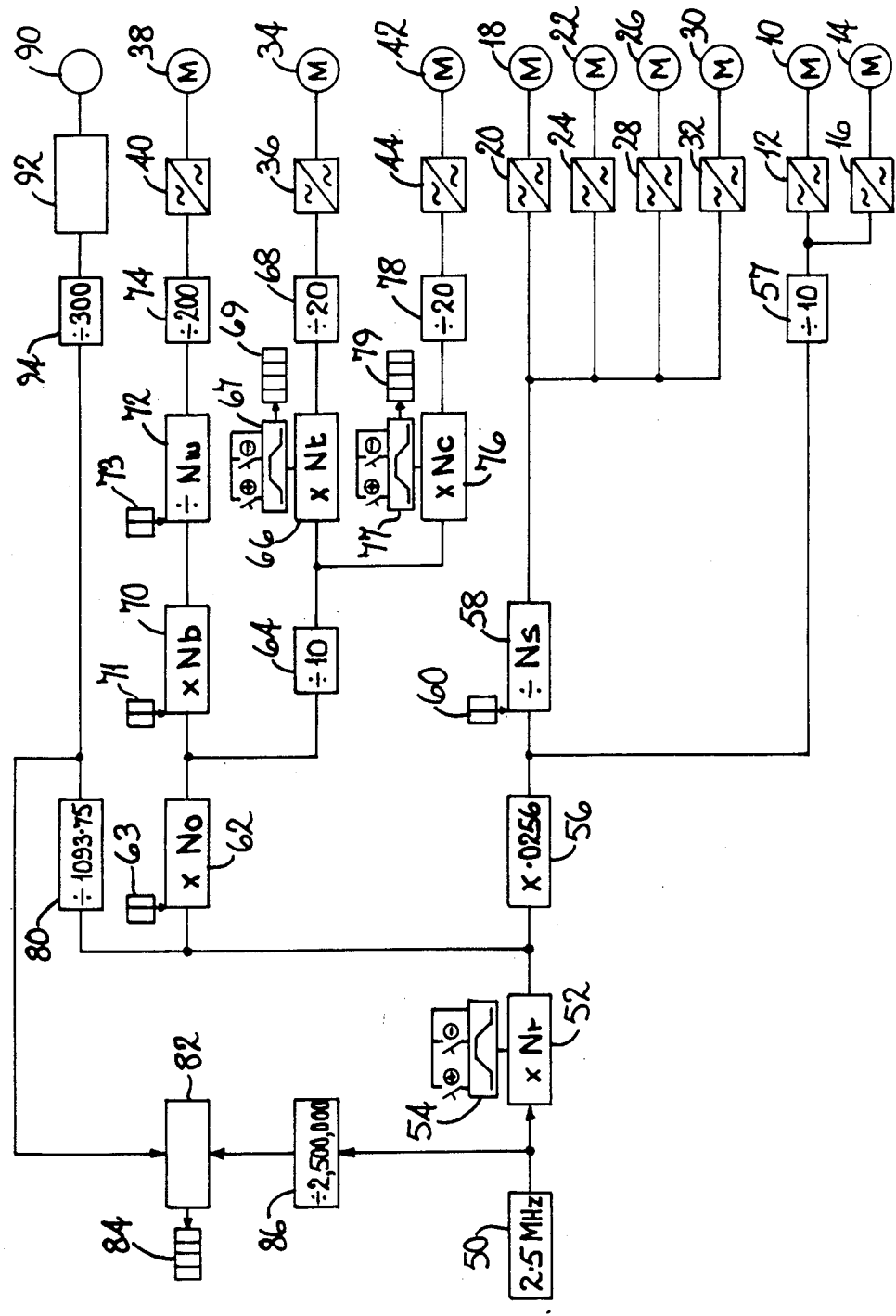

DRIVE SYSTEM FOR A GLASS CONTAINER PRODUCTION LINE

This is a continuation of co-pending application Ser. No. 862,850, filed on May 13, 1986, now abandoned.

BACKGROUND OF THE INVENTION

This invention is concerned with a drive system for a glass container production line.

The dominant type of machine used for the production of glass containers is the individual section type. In such a machine, a plurality of individual container forming units, or sections, are arranged side by side, are fed with gobs of molten glass from a common source, and feed their production to a common conveyor system. The sections are fed with gobs in a predetermined sequence and, at any given moment, one section is receiving a gob while the others are at different stages of their operation.

In a glass container factory, molten glass is produced by a furnace and is fed through forehearths to one or more production lines. Each production line comprises a feeder operable to produce gobs from molten glass delivered to the feeder from the furnace, a glass container manufacturing machine of the individual section type having a plurality of sections each of which is operable to mould gobs delivered thereto into glass containers, a gob distributor operable to distribute successive gobs produced by the feeder to the sections of the machine in a predetermined sequence, a conveyor system operable to carry completed containers away from the machine, and transferring means operable to transfer completed containers from the machine to the conveyor system, such transferring means being generally known as push-out means as the containers are pushed out on to a conveyor of the conveyor system. In some cases, two machines, with associated feeders, gob distributors and transferring means, operate to feed their output to the same conveyor system. A first conveyor of the conveyor system runs transversely of the sections and conveys the containers to ware-transferring means, usually provided by a transfer wheel, which removes the containers from the first conveyor and positions them on a second, or cross, conveyor which conveys them to a lehr in which the containers are heat-treated. Clearly, it is necessary that the operations of the feeder, the gob distributor, the machine and the transferring means are synchronised so that each gob produced can be moulded into a container which is transferred to the conveyor system. It is equally clear that the operations of the first conveyor, the ware-transferring means, and the second conveyor have to be synchronised so that each container can be conveyed to the lehr. Furthermore, the speeds of the machine and of the conveyor system have to be related so that the conveyor system can accommodate each container produced with an appropriate spacing between successive containers on the conveyor system. In order to achieve appropriate speeds, a drive system for the production line is used.

In a conventional drive system, at least the feeder, the gob distributor and the conveyor system are driven by A.C. electrical motors which operate at a speed dependent on the frequency of the power supply thereto. A single frequency is supplied to all the motors and this frequency is varied to speed up or slow down the entire production line. The motors drive their various mechanisms via gear arrangements which are arranged to synchronise with one another when the motors run at the same speed, i.e. when the motors receive power supplies with the same frequency. The machine itself, if it is of an older type, is timed by cams mounted on a timing drum driven by a further motor of the drive system which receives the single frequency, or, if it is of a newer type, is operated by a timing system which receives clock pulses produced by operation of one of the motors of the drive system, usually the feeder motor. Thus, increasing or decreasing the single frequency causes a corresponding change in the frequency of the clock pulses and hence keeps the machine in synchronisation. The transferring means may be driven by a further electrical motor of the drive system or may be operated by the timing system of the machine. The first conveyor, the ware-transferring means and the second conveyor of the conveyor system are driven by individual electrical motors of the drive system which all receive the single frequency.

With the conventional drive system described above, it is relatively easy to speed up or slow down the entire production line by varying the single frequency. However, any change in the relative speeds of the various parts of the production line requires changing the gear ratios. Furthermore, fine tuning of the system in operation is not possible. Thus, no change can be made in any speed without altering all the others. One disadvantage is that, if one of the sections goes out of use for a significant length of time, it is not possible to slow the feeder to produce less gobs as this would slow the other sections of the machine and upset the thermal balances in the sections necessary to correct moulding. In practice, this situation is dealt with by throwing away the gobs intended for the out-of-use section which is undesirable as the energy used in melting the glass is wasted. Another disadvantage is that wear on the gears can upset the synchronisation of the parts of the production line and compensation for this wear cannot be achieved during production.

A drive system is described in U.S. Pat. No. 4,007,028 which would overcome some of the disadvantages of the conventional drive system described above but which would introduce the further disadvantages mentioned below. In this system, there is a variable basic frequency source which is connected to adjustable multipliers associated with electrical motors driving the feeder, the gob distributor and the first conveyor. The multipliers each multiply the basic frequency by a different variable factor so that the speed of its associated motor can be varied independently. Variation of the basic frequency alters all the speeds so that the entire production line can be speeded up or slowed down. The speeds of the feeder, the gob distributor and conveyor can be individually adjusted to bring the production line to synchronisation. This system would avoid gear changes and allows fine tuning during operation. However, this system would have the disadvantages that it would be complicated to adjust and that it would be objectionable on safety grounds since there is not necessarily any correlation between the feeder and the gob distributor so that gobs could be produced at times when the gob distributor is not pointing at any of the sections.

It is an object of the invention to provide a drive system for a glass container production line which avoids gear changes and can be fine tuned during operation and which is simple to adjust and not objectionable on safety grounds.

BRIEF SUMMARY OF THE INVENTION

The invention provides a drive system for a glass container production line which comprises a feeder operable to produce gobs from molten glass delivered to the feeder from a furnace, a glass container manufacturing machine of the individual section type having a plurality of sections each of which is operable to mould gobs delivered thereto into glass containers, a gob distributor operable to distribute successive gobs produced by the feeder to the sections of the machine in a predetermined sequence, a conveyor system operable to carry completed containers away from the machine, and transferring means operable to transfer completed containers from the machine to the conveyor system, the drive system comprising electrical motor means operable to drive at least the feeder, the gob distributor and the conveyor system of the production line, each electrical motor means operating at a speed which is proportional to the frequency of an electrical signal supplied thereto, and supply means operable to supply electrical signals to the electrical motor means to cause them to operate at desired speeds, wherein the supply means comprises a source of a basic electrical signal having a basic frequency which determines the speed of the entire production line and directly determines the speed of the feeder, means for varying the basic frequency to vary the speed of the production line, means for producing an electrical distributor signal which determines the speed of the gob distributor, the distributor signal having a frequency obtained by multiplying the basic frequency by a factor which reflects the number of sections of the machine which are operating, and means for producing an electrical conveyor system signal which determines the speed of the conveyor system, the conveyor system signal having a frequency obtained by multiplying the basic frequency by a factor which reflects the number of containers produced by the machine and the required spacing thereof on the conveyor system.

With a drive system according to the last preceding paragraph, the entire production line can be speeded up or slowed down by varying the basic frequency. Setting this basic frequency determines the feeder speed without the need for further settings and determines the speed of the gob distributor to one of a number of speeds representing the use of different numbers of sections. Thus, the system is inherently safe as the speeds of the feeder and gob distributor are related in one of a number of fixed relationships all of which result in gobs being delivered to sections. It is simple to adjust the speed of the gob distributor as only the number of sections operating is needed.

It should be noted that, except where reference to multiplication followed by division is made, references herein to dividing a frequency by a factor are intended to include multiplying the frequency by the reciprocal of that factor and references to multiplying a frequency by a factor are intended to include dividing by the reciprocal of that factor since such operations achieve the same effect. Furthermore, such references are also intended to include a series of multiplications or divisions or combinations thereof which have the effect of a multiplication or division. Where reference to multiplication followed by division is made, as it is in relation to the ware-transferring signal referred to below, it is to be understood that the order of these operations can be reversed.

Advantageously, where the conveyor system comprises a first conveyor arranged to receive containers from the transferring means, a second conveyor running transversely of the first conveyor, and ware-transferring means operable to transfer containers from the first to the second conveyor, the electrical motor means comprises individual electrical motor means operable to drive the first conveyor, the second conveyor and the ware-transferring means, and the supply means comprises means for producing a first conveyor electrical signal, a second conveyor electrical signal and a ware-transferring electrical signal which respectively determines the speeds of the first and second conveyors and the ware-transferring means, these signals having frequencies obtained by multiplying the conveyor system signal frequency by individual factors.

The supply means of the drive system may also comprise means for varying the conveyor system signal frequency to thereby vary the speeds of the first conveyor, the second conveyor and the ware-transferring means simultaneously but without altering the ratios between the speeds. The conveyor system can thus be adjusted as a unit to specific production speeds and required ware-spacing on the conveyor system. The supply means may also comprise means for varying the factors used to obtain the first conveyor signal, the second conveyor signal and the ware-transferring signal independently of one another. In this way, the components of the conveyor system can be adjusted relative to one another to obtain exact synchronisation and to maintain such synchronisation during operation.

The ware-transferring signal has to have a frequency calculated according to the spacing of the containers on the first conveyor and the pusher finger distance of the transfer wheel, i.e. the distance between successive container-pushing fingers around the circumference of the wheel. If the frequency of the ware-transferring signal is determined by multiplying the conveyor system frequency by a factor, inaccuracies occur when the frequency requires to be divided by certain numbers. For example, if the frequency requires to be divided by 3, no matter how many decimal places are provided in the multiplying factor there will still be an inaccuracy. For example, if the conveyor system frequency is 1,000,000 Hz. and the multiplying factor is 0.3333 a frequency of 333,300 Hz, is achieved which is inaccurate by over 33 Hz. Any inaccuracy will eventually shown in lack of synchronisation as the production line will run for a considerable period (even for weeks). This particular problem could be solved by using a dividing factor (in this case 3) but there are circumstances where this would also cause inaccuracies. For example, if the frequency required is nine tenths of the conveyor system frequency, the division factor would be 1.111 which would convert 1,000,000 Hz. to 900,090 Hz. instead of 900,000 Hz. Thus, it is advantageous if the factor used to obtain the ware-transferring signal is achieved by multiplying the conveyor system frequency by a first factor and dividing the resulting frequency by a second factor. In this way greater accuracy can be obtained. Indeed, it is found that sufficient accuracy can be obtained by adjusting only four digits, two in the multiplication factor and two in the division factor. Clearly, the division can be carried out before the multiplication if desired.

In a drive system in accordance with the invention, the machine speed may be taken from the feeder in conventional manner so that the machine is synchronised with the feeder. The transferring means operable to transfer completed containers from the machine to the conveyor may also have its speed controlled from the machine timing system so that it is synchronised with the feeder. Alternatively, the drive system may comprise electrical motor means operable to drive the transferring means, the speed of the electrical motor means being determined by the frequency of the distributor signal. In this case, the transferring means (or push out) is synchronised automatically with the gob distributor and is, hence, adjusted to the number of sections.

Where the production line comprises a further feeder, gob distributor and machine, for example two six-section machines may be arranged side-by-side to make up twelve sections, a drive system in accordance with the invention may comprise electrical motor means operable to drive the further feeder at a speed determined by the basic frequency and electrical motor means operable to drive the further gob distributor at a speed determined by the frequency of the distributor signal. Thus, the further feeder and gob distributor operate at the same speeds as the first-mentioned feeder and gob distributor.

The electrical motor means of a drive system in accordance with the invention may be the conventional combination of an inverter drive and an A.C. electric motor. In this case, the electrical signal is supplied to the inverter drive which drives the motor at a speed proportional to the frequency of the signal. However, one or more of the electrical motor means may be a servo-motor controlled by a servo-motor controller, the electrical signal being supplied to the controller to determine the speed of the servo-motor. Servo-motor operated feeders, gob distributors and push-outs have been proposed as also has a servo-operated machine which could also be incorporated in the drive system.

In order to assist an operator, a drive system according to the invention may also comprise means for displaying the number of gobs produced by the feeder in unit time, the number being produced by dividing the basic frequency by an appropriate factor and measuring the frequency so produced. The system may periodically produce a signal which causes the display to be up-dated.

The invention also provides a drive system for a glass container production line which comprises a feeder operable to produce gobs from molten glass delivered to the feeder from a furnace, a glass container manufacturing machine of the individual section type having a plurality of sections each of which is operable to mould gobs delivered thereto into glass containers, a gob distributor operable to distribute successive gobs produced by the feeder to the sections of the machine in a predetermined sequence, a conveyor system operable to carry complete containers away from the machine, and transferring means operable to transfer completed containers from the machine to the conveyor system, the drive system comprising electrical motor means operable to drive at least the feeder, the gob distributor and the conveyor system of the production line, each electrical motor means operating at a speed which is proportional to the frequency of an electrical signal supplied to thereto, and supply means for supplying electrical signals to the electrical motor means to cause them to operate at desired speeds, wherein the supply means comprises a source of a basic electrical signal having a basic frequency which determines the speed of the entire production line, means for varying the basic frequency to vary the speed of the production line, means for producing a conveyor system signal which determines the speed of the conveyor system, the conveyor system signal having a frequency obtained by multiplying the basic frequency by a factor which reflects the number of containers being produced and the required spacing thereof on the conveyor system, wherein the conveyor system comprises a first conveyor operable to carry containers away from the machine, and a ware transfer wheel operable to transfer containers from the conveyor to a second conveyor running transversely of the first conveyor, the first conveyor and the ware transfer wheel being driven by electrical motor means each operating at a speed which is proportional to the frequency of an electrical signal supplied thereto and the supply means being operable to supply a conveyor signal to the motor means of the first conveyor and a ware-transferring signal to the motor means of the ware transfer wheel to cause them to operate at desired speeds, the conveyor signal a having a frequency obtained by multiplying the conveyor system frequency by a tuning factor, and the ware transfer signal having a frequency obtained by successively multiplying and dividing the conveyor system frequency by factors which combine to match the speed of the ware transfer wheel to that of the conveyor.

Conveniently, in a drive system in accordance with the last preceding paragraph, the supply means is also operable to supply a second conveyor signal to the motor means of the second conveyor to cause it to operate at a desired speed, the second conveyor signal having a frequency obtained by multiplying the conveyor system frequency by a tuning factor.

The invention also provides a drive system for a glass container conveyor system which conveys containers one-behind-the-other away from a glass container manufacturing machine of the individual section type, the conveyor system comprising a first conveyor, a second conveyor running transversely of the first conveyor, and a ware transfer wheel operable to transfer containers from the first conveyor to the second conveyor, the drive system comprising electrical motor means operable to drive the conveyors and the ware transfer wheel, each electrical motor means operating at a speed which is proportional to the frequency of an electrical signal, supplied thereto, and supply means operable to supply electrical signals to the motor means to cause them to operate at desired speeds, wherein the supply means comprise means for producing an electrical conveyor system signal having a conveyor system frequency which determines the speed of the conveyor system, means for varying the conveyor system frequency to vary the speed of the conveyor system, means for producing a first conveyor signal which determines the speed of the first conveyor signal having a frequency obtained by multiplying the conveyor system frequency by a tuning factor, and means for producing a ware transfer signal which determines the speed of the ware transfer wheel the ware transfer signal having a frequency obtained by multiplying the conveyor system frequency by a first factor and dividing the resultant frequency by a second factor.

BRIEF DESCRIPTION OF THE DRAWING

There now follows a detailed description, to be read with reference to the accompanying drawing, of a drive system for a glass container production line which is illustrative of the invention. The figure is a block schematic diagram of a preferred design of such drive system.

DETAILED DESCRIPTION OF PREFERRED EMBODIMENT OF THE INVENTION

The illustrative drive system is for a glass container production line which comprises a feeder operable to produce gobs from molten glass delivered to the feeder from a furnace. The illustrative drive system is arranged to control either one or two conventional feeders, i.e. feeders driven by an inverter drive in combination with an A.C. electric motor, or one servo feeder, i.e. one driven by a servo-motor controlled by a servo-motor controller. However, for any given production line, only one of these options will be utilised. Since a feeder may produce one, two, three or even four gobs simultaneously which are all supplied to the same section which is equipped with the appropriate number of moulds, the speed of the feeder is expressed in cuts per minute, the term "cuts" referring to cuts of the shears of the feeder.

The production line controlled by the illustrative drive system also comprises a glass container manufacturing machine of the individual section type having a plurality of sections each of which is operable to mould gobs delivered thereto into glass containers. The machine is of conventional construction and includes a timing system which takes its clock signals to give the speed and maintain synchronisation from the feeder in the well-known manner. The production line may also comprise a further machine.

The production line also comprises a gob distributor operable to distribute successive gobs produced by the feeder to the sections of the machine in a predetermined sequence. The gob distributor is of conventional construction having a guiding trough for each gob produced simultaneously by the feeder and points the or each trough towards the appropriate section so that the or each gob is delivered thereto. Where there is a further feeder and machine, a further gob distributor is associated therewith.

The production line also comprises a conveyor system operable to carry completed containers away from the or each machine. The conveyor system comprises a first conveyor leading away from the machine, ware-transferring means (usually provided by a transfer wheel), and a second conveyor running transversely to the first conveyor. The ware-transferring means is operable to remove containers from the first conveyor and position them on the second conveyor. The first conveyor and the second conveyor are conveyor belts. The production line also comprises means for transferring completed containers from the or each machine to the conveyor, this means being a conventional push-out.

The illustrative drive system will now be described on the assumption that the production line comprises two conventional feeders, two gob distributors, two machines, and two push-outs. The drawing also shows how a servo feeder would be controlled. The illustrative drive system comprises electrical motor means operable to drive a first feeder, this motor means comprising an A.C. electric motor 10 and an inverter drive 12 therefore, and electrical motor means operable to drive a second feeder comprising an A.C. electric motor 14 and an inverter drive 16 therefor.

The illustrative drive system also comprises seven further A.C. electric motors each with an inverter drive, a motor 18 and inverter 20 being operable to drive a first gob distributor, a motor 22 and inverter 24 being operable to drive a second gob distributor, a motor 26 and inverter 28 being operable to drive a timing cam shaft of a first push-out, a motor 30 and inverter 32 being operable to drive a timing cam shaft of a second push-out, a motor 34 and inverter 36 being operable to drive a first conveyor, a motor 38 and inverter 40 being operable to drive a transfer wheel, and a motor 42 and inverter 44 being operable to drive a second conveyor. As will appear from the description below, each electrical motor means operates at a speed which is proportional to the frequency of an electrical signal supplied thereto and the remainder of the illustrative drive system forms supply means for supplying electrical signals to the electrical motor means to cause them to operate at desired speeds.

The illustrative drive means comprises a source 50 of an electrical signal having a reference frequency of 2.5 MHz. The source 50 is connected to a source 52 of an electrical signal having a basic frequency which determines the speed of the entire production line and directly determines the speed of the feeders by controlling the speed of the motors 10 and 14. The source 52 derives the basic frequency from the reference frequency by multiplying by a factor Nr which is less than 1. This factor Nr can be set at any multiple of 0.004375 up to 0.875 by using varying means 54. Varying the factor Nr varies the basic frequency and thus the speed of the production line. The means 54 includes a switch for increasing the factor by 0.004375 and a switch for decreasing the factor by this amount. The number 0.004375 is chosen so that an operation of one of the switches increases or decreases the number of cuts per minute of the feeders by 1.

The basic frequency produced by the source 52 is applied to a multiplier 56 which multiples the frequency by a factor of 0.0256. This is not an adjustable factor. The output of the multiplier passes to a divider 57 which divides the frequency by a fixed factor of 10. The output of the divider 57 is applied to the inverters 12 and 16. Thus, the speed of feeders is determined directly by the basic frequency determined by the factor Nr as the basic frequency is multiplied and then divided by fixed factors before being applied to the inverters 12 and 16. The output of multiplier 56 also passes to means, in the form of a divider 58, for producing an electrical distributor signal which determines the speed of the gob distributors by controlling the speed of the motors 18 and 22. The factor 0.0256 of the multiplier 56 is selected so that the factor Ns of the divider 58 is the number of sections operating in each machine. The factor Ns is adjusted by means of adjusting means 60 having thumb switches adjustable between 4 and 12. The frequency of the second electrical signal is, thus, obtained by dividing the basic frequency by a factor obtained by multiplying by 0.0256 and dividing by the number of sections. This factor, thus, reflects the number of sections. The second electrical signal is applied to the inverters 20, 24, 28 and 32 so that the two gob distributors and the two push-outs operate at the same speed. Thus, the speed of the push-outs is determined by the frequency of the distributor signal.

The illustrative drive system also comprises means for producing an electrical conveyor system signal which determines the speed of the conveyor system. The conveyor system signal has a frequency obtained by multiplying the basic frequency by a factor which reflects the number of the containers being produced and the required spacing thereof on the conveyor system. This means comprises a multiplier 62 operable to multiply the basic frequency by a factor No. The value of the factor No determines the speed of the entire conveyor system comprising the first conveyor, the ware-transfer wheel, and the second conveyor. Means 63 for varying the factor No comprises thumb switches which can be adjusted between 0.16 and 0.96.

The conveyor system signal passes to a divider 64 operable to divide the output of the multiplier 62 by a fixed factor of 10. The output of the divider 64 passes to a multiplier 66 operable to multiply the output of the divider 64 by a factor Nt, and the output of the multiplier 66 passes to a divider 68 operable to divide the output of the multiplier 66 by a fixed factor of 20. The output of the divider 68 which is a first conveyor signal is applied to the inverter 36 to control the speed of the first conveyor. The factor Nt is for fine tuning the speed of the first conveyor and can be adjusted by adjusting means 67 between 0.899 and 1.000 in steps of 0.001 by switches of the means 67, a display 69 shows the setting of the factor Nt. The speed of the first conveyor thus depends on the values of Nr, No and Nt. Altering Nr alters the speed of the entire production line including the first conveyor, altering No alters the speed of the entire conveyor system including the first conveyor, and altering Nt tunes the first conveyor to the remainder of the conveyor system.

The illustrative drive system also comprises means for producing an electrical ware-transfer signal which determines the speed of the ware-transferring means. This means comprises the multiplier 62, a multiplier 70 which multiplies the output of the multiplier 62 by a factor Nb, a divider 72 which divides the output of the multiplier 70 by a factor Nw, and a divider 74 which divides the output of the divider 72 by 200. The output of the divider 74 is the ware-transfer signal and is applied to the inverter 40 to control the speed of the ware-transferring means. The factor Nb can be adjusted between 1 and 99 by adjusting means 71 and the factor Nw can be adjusted between 3 and 99 by adjusting means 73. By a suitable combination of factors Nb and Nw, a variety of speeds for the ware-transferring means can be achieved.

The illustrative drive system also comprises means for producing an electrical second conveyor signal which determines the speed of the second conveyor. This means comprises the multiplier 62 and the divider 64, a multipler 76 operable to multiply the output of the divider 64 by a tuning factor Nc, and a divider 78 operable to divide the output of the multiplier 76 by fixed factor of 20. The output of the divider 78 is the second conveyor signal and is applied to the inverter 44 to control the speed of the cross conveyor. The factor Nc is a tuning factor and can be adjusted by varying means 77 between 0.290 and 1.000 in steps of 0.001 by operating switches of means 77 The factor Nc adjusts the speed of the second conveyor.

Altering the basic frequency by varying the factor Nr alters the speeds of the first conveyor, the ware-transferring means and the second conveyor simultaneously without altering the ratios between the speeds. Furthermore, the factors by which the basic frequency is divided are all dependent on the value of No so that means 63 provides means for varying the factors of the signals of the conveyor system simultaneously in proportion to one another without altering the basic frequency. As the factors can also be adjusted independently by varying Nb and Nw, or Nt or Nc, the means 71 and 73, 67 and 77 provide means for adjusting the speeds of the first conveyor, ware-transferring means and second conveyor independently relative to one another.

As an example, suppose a machine has 10 sections receiving 2 gobs simultaneously and the feeder is to operate at 120 cuts per minute. Suppose also that the required advance of the first conveyor and second conveyor is 7.875 inches (20 cms) per second.

The factor Nr is set to give 120 cuts per minute by setting it to $0.004375 \times 120$, i.e. to 0.525. Thus, the basic frequency is $0.525 \times 2,500,000$, i.e. 1,312,500 Hz. The multiplier 56 has an output of $1,312,500 \times 0.0256$, i.e. 33,600 Hz. which is divided by 10 by the divider 57 to give an input to the inverters 12 and 16 of 3360 Hz. As the motors produce revolutions per minute equal to the input frequency divided by 1.75, this gives 1920 rpm and, as the motors 10 and 14 drive their feeders through a 1:16 gear reduction, this gives the required 120 cuts per minute.

The factor Ns is the number of sections, i.e. 10 so that the inverters 20, 24, 28 and 32 receive a frequency of 3360 Hz. giving 1920 rpm. The motors 18, 22, 26 and 30 drive their respective cam shafts through a 1:160 gear reduction so that the cams turn at 12 rpm as is required.

The factor No is set at 0.36 to give the required speed for the conveyor and cross conveyor with the factor Nt set at 1.000 and the factor Nc set at 1.000. Thus, the output of the multiplier 62 is $1,312,500 \times 0.36$, i.e. 472,500 Hz. The output of the divider 64 is 47,250 Hz. and that received by the inverters 36 and 44 is 2362.5 Hz. This gives 1350 rpm for the motors 34 and 42 giving an advance of 7.875 inches per second (20 cms per second) for the conveyor and cross conveyor as is required.

The ware transferring means with a pusher finger distance of 4 inches (10.16 cms) has to accommodate 240 containers per minute. This requires that its motor 38 have 1200 rpm. To achieve this the inverter 40 must receive an input at $1200 \times 1.75$, i.e. at 2100 Hz. Thus, the output of the divider 72 must be 420000 Hz. The combination of the multiplier 70 and divider 72 must, therefore, turn an input of 472,500 Hz. into an output of 420,000 Hz. The division factor is 1.125 which can be achieved by setting Nb at 80 and Nw at 90. If the the pusher finger distance is increased, the motor 38 would have to rotate more rapidly. For example, if the pusher finger distance were 5 inches (12.7 cms), Nb can be 80 and Nw can be 72. Thus, the conveyor system speed signal of 472,500 Hz is multiplied by 80 and then divided by 72 giving 525,000 Hz. This is divided by 200 giving 2625 Hz and 1500 rpm. The factors Nc, and Nt, can be adjusted to trim the conveyor system during operation. The entire conveyor system can be speeded up or slowed down by adjusting the factor No.

The illustrative drive system also comprises means for displaying the number of gobs produced by the feeder in unit time, the number being produced by dividing the basic frequency by an appropriate factor and measuring the frequency so produced. This means comprises a divider 80 operable to divide the output of the multiplier 54 by a fixed factor of 1093.75, a frequency measurer 82 operable to measure the frequency of the output of the divider 80, and a display panel 84 arranged to display one tenth of the frequency measured by the measurer 82. Thus, in the example given above, the divider 80 divides 1,312,500 by 1093.75 to give 1200 Hz, and the display 84 displays 120 which the number of cuts per minute or half the number of gobs produced. The display 84 is updated once a second being re-set by a signal from a divider 86 arranged to divide the reference frequency by a fixed factor of 2,500,000 to give one pulse per second.

If any of the parts of the production line are driven by a servo-motor instead of an A.C. electric motor, instead of an inverter and motor combination, the illustrative drive system comprises a servo-motor and controller therefor. The drawing shows a servo-motor 90 and controller 92 for operating a feeder. In this case, the drive system produces an electrical signal which is supplied to the controller 92 to determine the speed of the motor 90. The output of the divider 80 is divided by a fixed factor of 300 by a divider 94 and the output of the divider 94 is applied to the controller 92. Thus, in the example given above, the divider 94 produces an output of 1200 divided by 300, which is 4 pulses per second or 240 pulses per minute which causes 120 cuts per minute by the feeder driven by the controller 92.

We claim:

1. An improved drive system for a glass container production line which comprises a feeder operable to produce gobs from molten glass delivered to the feeder from a furnace, a glass container manufacturing machine of the individual section type having a plurality of sections each of which is operable to mould gobs delivered thereto into glass containers, a gob distributor operable to distribute successive gobs produced by the feeder to the sections of the machine in a predetermined sequence, a conveyor operable to carry completed containers away from the machine, and transferring means operable to transfer completed containers from the machine to the conveyor system; the drive system including electrical motor means operable to drive at least the feeder, the gob distributor and the conveyor system of the production line, each electrical motor means operating at a speed which is proportional to the frequency of an electrical signal supplied thereto, supply means operable to supply electrical signals to the electrical motor means to cause them to operate at desired speeds, said the supply means including a source of a basic electrical signal of a basic frequency, means for modifying the basic frequency according to user input, and invididual frequency control means for further modifying the modified basic frequency to produce respective drive signals for predetermined electrical motor means of the glass container production system, wherein improved supply means comprises
    means linking the source of the basic electrical signal with a feeder electrical motor means so that the basic frequency determines the speed of the entire production line and directly determines the feeder speed;
    gob distributor multiplier means for multiplying the modified basic frequency signal by a first factor proportional to the number of sections of said glass container manufacturing machine to which gobs are to be delivered;
    gob distributor input means for user selection of one of a limited number of values of said first factor, in accordance with the desired number of sections to receive gobs;
    conveyor system multiplier means for multiplying the modified basic frequency signal by a second factor bearing a predefined relationship to the number of containers produced by the machine and the required spacing thereof on the conveyor; and
    conveyor input means for user selection of one of a limited number of values of said second factor.

2. A drive system according to claim 1, wherein the conveyor system comprises a first conveyor arranged to receive containers from the transferring means, a second conveyor running transversely of the first conveyor, and ware-transferring means operable to transfer containers from the first to the second conveyor, the electrical motor means comprising individual electrical motor means operable to drive the first conveyor, the second conveyor and the ware-transferring means, and the supply means comprising means for producing a first conveyor electrical signal, a second conveyor electrical signal and a ware-transferring electrical signal which respectively determine the speeds of the first and second conveyors and the ware-transferring means, these signals having frequencies obtained by multiplying the conveyor system signal frequency by individual factors.

3. A drive system according to claim 2, wherein the supply means comprises means for varying the conveyor signal frequency to thereby vary the speeds of the first conveyor, the second conveyor and the ware-transferring means simultaneously but without altering the ratios between the speeds.

4. A drive system according to claim 2, wherein the supply means also comprises means for varying the factors used to obtain the first conveyor signal, the second conveyor signal and the ware-transferring signal independently of one another.

5. A drive system according to claim 2, wherein the factor used to obtain the ware-transferring signal is achieved by multiplying the conveyor system frequency by a first factor and dividing the resulting frequency by a second factor.

6. A drive system according to claim 1, wherein the drive system also comprises electrical motor means operable to drive the transferring means operable to transfer completed containers from the machine to the conveyor system, the speed of the electrical motor means being determined by the frequency of the distributor signal.

7. A drive system according to claim 1, wherein the production line comprises a further feeder, gob distributor and machine and the drive system comprises electrical motor means operable to drive the further feeder at a speed determined by the basic frequency and electrical motor means operable to drive the further gob distributor at a speed determined by the frequency of the distributor signal.

8. A drive system according to claim 1, wherein one or more of the electrical motor means is a servo-motor controlled by a servo-motor controller, the electrical signal being supplied to the controller to determine the speed of the servo-motor.

9. A drive system according to claim 1, wherein the system also comprises means for displaying the number of gobs produced by the feeder in unit time, the number being produced by dividing the basic frequency by an appropriate factor and measuring the frequency so produced.

10. An improved drive system for a glass container production line which comprises a feeder operable to produce gobs from molten glass delivered to the feeder from a furnace, a glass container manufacturing machine of the individual section type having a plurality of sections each of which is operable to mould gobs delivered thereto into glass containers, a gob distributor operable to distribute successive gobs produced by the feeder to the sections of the machine in a predetermined sequence, a conveyor operable to carry completed containers away from the machine, and transferring means operable to transfer completed containers from the machine to the conveyor system, the drive system including electrical motor means operable to drive at least the feeder, the gob distributor and the conveyor system of the production line, each electrical motor means operating at a speed which is proportional to the frequency of an electrical signal supplied thereto, and supply means operable to supply electrical signals to the electrical motor means to cause them to operate at desired speeds, said the supply means including a source of a basic electrical signal of a basic frequency, means for modifying the basic frequency according to user input, and individual frequency control means for further modifying the modified basic frequency to produce respective drive signals for the gob distributor electrical motor means, wherein improved individual frequency control means comprises means directly linking the source of the basic electrical signal with a feeder drive means so that the basic frequency determines the speed of the entire production line and directly determines the feeder speed;

gob distributor multiplier means for multiplying the modified basic frequency signal by a factor proportional to the number of sections of said glass containers manufacturing machine to which gobs are to be delivered; and gob distributor input means for user selection of one of a limited number of values of said factor, in accordance with the desired number of sections to receive gobs.

11. A drive system according to claim 10, wherein the supply means is operable to supply a second conveyor signal to the motor means of the second conveyor to cause it to operate at a desired speed, the second conveyor signal having a frequency obtained by multiplying the conveyor system frequency by a tuning factor.

* * * * *